(12) United States Patent  
Fukasawa

(10) Patent No.: US 8,589,478 B2
(45) Date of Patent: Nov. 19, 2013

(54) INFORMATION PROCESSING APPARATUS, CONTROL METHOD OF INFORMATION PROCESSING APPARATUS, AND STORAGE MEDIUM

(75) Inventor: Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 12/967,481

(22) Filed: Dec. 14, 2010

(65) Prior Publication Data

US 2011/0145329 A1    Jun. 16, 2011

(30) Foreign Application Priority Data

Dec. 16, 2009    (JP) .................................. 2009-285757

(51) Int. Cl.
G06F 15/16    (2006.01)
(52) U.S. Cl.
USPC ......................................................... 709/203
(58) Field of Classification Search
USPC ......................................................... 709/203
See application file for complete search history.

(56) References Cited

U.S. PATENT DOCUMENTS

2006/0077423 A1    4/2006 Mathieson et al.
2006/0077448 A1*   4/2006 Plewnia et al. ............... 358/1.15

FOREIGN PATENT DOCUMENTS

| CN | 101410803 A | 4/2009 |
| JP | 2006-053905 A | 2/2006 |
| JP | 2006-127503 A | 5/2006 |
| JP | 2006-260145 A | 9/2006 |

OTHER PUBLICATIONS

Office Action for Counterpart Korean Application No. 10-2010-0124405 dated Nov. 20, 2012.
Chinese Office Action issued in corresponding application No. 201010610762.5 on Jan. 31, 2013.

* cited by examiner

*Primary Examiner* — Larry Donaghue
*Assistant Examiner* — Marshall McLeod
(74) *Attorney, Agent, or Firm* — Carter, DeLuca, Farrell & Schmidt LLP

(57) ABSTRACT

An information processing apparatus including a display unit that is capable of displaying an operation screen provided by a server notifies the server of a content of an instruction from a user via an operation screen provided by the server and displayed on the display unit, and if the server requests execution of a process based on the notified content of the instruction, executes the requested process. The information processing apparatus determines an operation screen displayed on the display unit after notifying the server, and if the operation screen provided by the server is displayed on the display unit, performs control to execute the process requested by the server, and if another operation screen is displayed on the display unit instead of the operation screen provided by the server, performs control to not execute the process requested by the server.

9 Claims, 7 Drawing Sheets

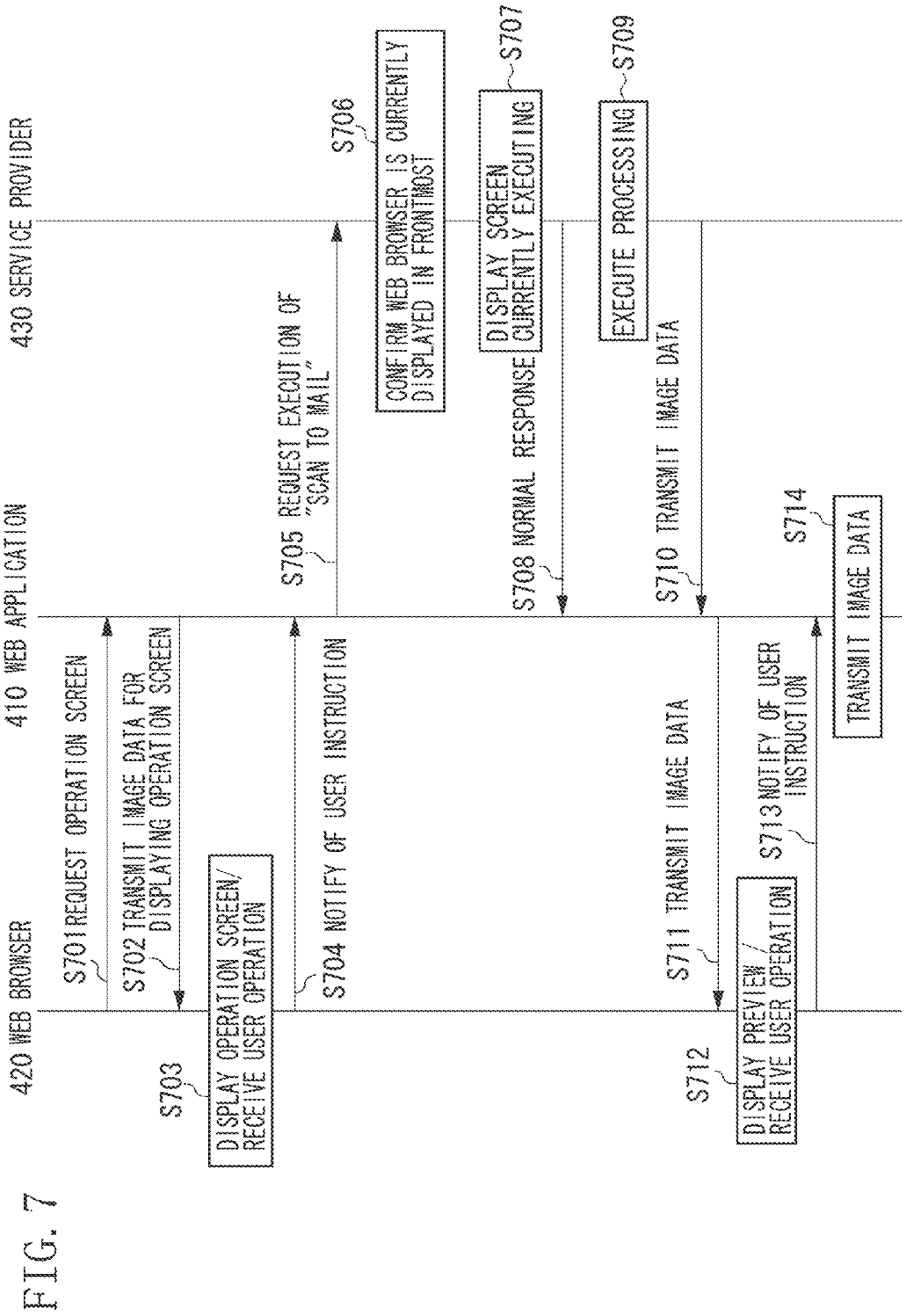

INFORMATION PROCESSING APPARATUS, CONTROL METHOD OF INFORMATION PROCESSING APPARATUS, AND STORAGE MEDIUM

BACKGROUND OF THE INVENTION

1. Field of the Invention

The present invention relates to an information processing apparatus that includes a display unit capable of displaying an operation screen provided by a server.

2. Description of the Related Art

An information processing apparatus such as a personal computer (PC) which is connected to a server on a network and displays on a display unit therein an operation screen provided by the server is conventionally known. For example, there is a system in which a web server included in the information processing apparatus displays the operation screen acquired from a web server on the network.

In such a case, the web browser in the information processing apparatus requests the web server to provide the operation screen. A web application in the web server then responds to the request received from the information processing apparatus by transmitting a hypertext markup language (HTML) file for the web browser to display the operation screen. The web browser in the information processing apparatus analyzes the received HTML file and displays the operation screen based on the description of the HTML file.

Further, if a user inputs an instruction via the operation screen displayed on the web browser, the web browser notifies the web server of the input instruction. The web application on the web server that receives the notification then executes a process according to the input instruction.

Recent multifunction peripherals (MFP) which include a scanner and a printer also include the above described web browser. The MFP thus displays on the web browser the operation screen provided by the web server based on the above described procedure and receives various instructions from the user.

Further, Japanese Patent Application Laid-Open No. 2006-127503 discusses a technique in which the web server provides the operation screen to which the user inputs instructions for using various functions included in the MFP. In other words, a user of the MFP inputs an instruction to the MFP via the operation screen displayed on the web browser. The web browser of the MFP then notifies the web server of the input instruction.

Upon receiving such a notification, the web server requests the MFP to perform various processes according to the content of the instruction input by the user. The MFP which receives such a request thus performs the requested process. As a result, it becomes unnecessary to store in the MFP all pieces of operation screen information for operating the MFP. Further, the content of the operation screen can be easily changed on the web server.

The technique discussed in Japanese Patent Application Laid-Open No. 2006-127503 once notifies the server of the instruction input via the operation screen displayed on the display unit in the information processing apparatus. The information processing apparatus then performs various processes according to the request that is returned from the server. However, in such a case, problems are generated as described below.

More specifically, the user may operate on the information processing apparatus and switch the operation screen displayed on the display unit to another operation screen after the information processing apparatus notifies the server of the instruction input via the operation screen and is then requested by the server to execute the process. For example, after the information processing apparatus notifies the web server of the instruction input via the operation screen displayed on the web browser, the user may close the web browser and then switch to another operation screen provided by the application in the information processing apparatus. Further, the user may newly display an operation screen provided by the application in the information processing apparatus in front of the web browser while the web browser continues to be activated.

In the above described cases, if the process requested by the server requires a user operation to be performed after the process is executed, the user operation is not performed even when the process is executed. Execution of the process may thus become useless. For example, in one case it is assumed that a process requested by the server is to read a document, and it is necessary for the user to preview and confirm image data acquired by executing the process. In such a case, the user cannot preview and confirm the image data if the web browser is closed. As a result, the processes of previewing and confirming the image data and thereafter are not performed, so that the reading process becomes useless.

Further, for example, it is assumed that when a process requested by the server is executed, the information processing apparatus displays a screen indicating that the "process is being executed" based on screen information stored therein. In such a case, when the user is operating on the new operation screen, the screen may be switched (or displayed by overwriting on the frontmost screen) to the screen indicating that the "process is being executed" simultaneously as the process which is requested in delay from the server is started. The user operation thus becomes interrupted.

SUMMARY OF THE INVENTION

Aspects of the present invention are directed to restricting, if an operation screen has changed to another screen when a process according to a request from a server is to be executed, execution of the process according to the request from the server.

According to an aspect of the present invention, an information processing apparatus including a display unit that is capable of displaying an operation screen provided by a server includes a notification unit configured to notify the server of a content of an instruction from a user via an operation screen provided by the server and displayed on the display unit, a processing unit configured to execute, if the server requests execution of a process based on the content of the instruction notified from the notification unit, the requested process, a first determination unit configured to determine an operation screen displayed on the display unit after the notification unit notifies the server, and a control unit configured to control, if the operation screen provided by the server is displayed on the display unit, the processing unit to execute the process requested by the server, and to control, if another operation screen is displayed on the display unit instead of the operation screen provided by the server, the processing unit to not execute the process requested by the server, based on the determination by the first determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 7 is a sequence diagram illustrating an operation in which a web browser, a web application, and a service provider execute a series of processes.

DESCRIPTION OF THE EMBODIMENTS

Various exemplary embodiments, features, and aspects of the invention will be described in detail below with reference to the drawings.

Not all of the combinations of features described in the exemplary embodiments are necessary as means for solving problems according to aspects of the present invention.

Figure 1:
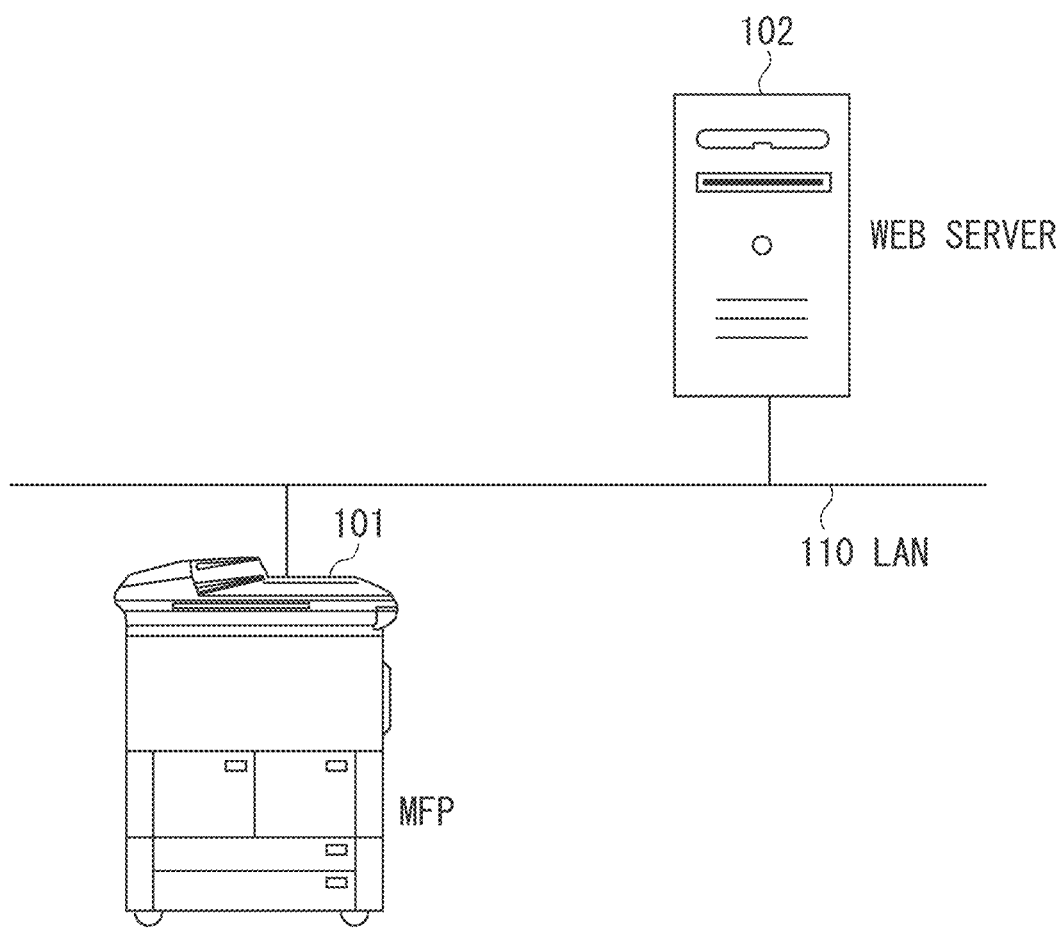
FIG. 1 illustrates an information processing system according to an exemplary embodiment of the present invention.

FIG. 1 illustrates an information processing system according to an exemplary embodiment. Referring to FIG. 1, an MFP 101 and a web server 102 are connected to a local area network (LAN) 110 to be communicable with each other.

Figure 2:
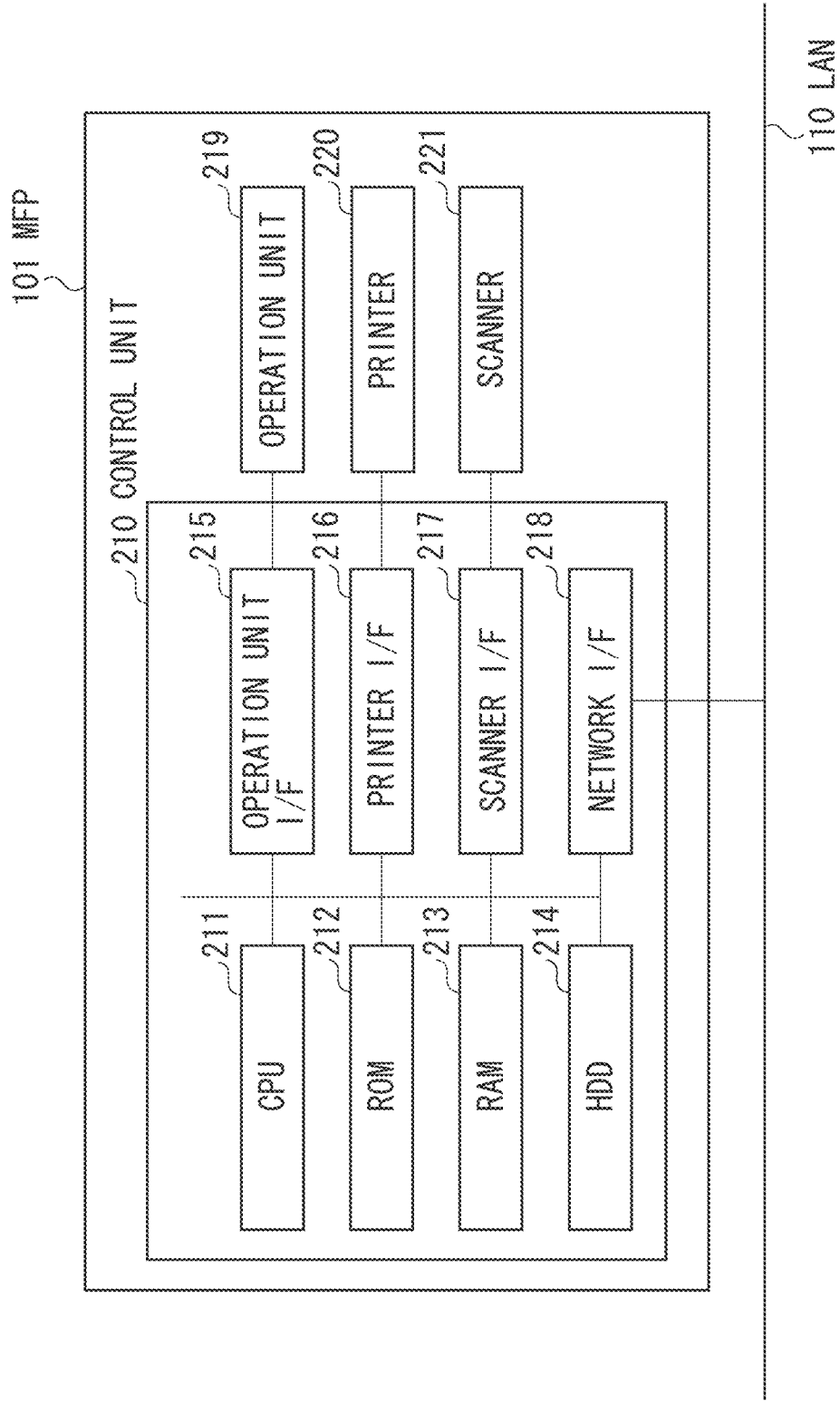
FIG. 2 is a block diagram illustrating a configuration of an MFP according to an exemplary embodiment of the present invention.

FIG. 2 is a block diagram illustrating a configuration of the MFP 101. Referring to FIG. 2, a control unit 210 which includes a central processing unit (CPU) 211 controls operations of the entire MFP 101. The CPU 211 reads out a control program stored in a read-only memory (ROM) 212 and performs various controls, such as read control and transmission control. The MFP 101 is thus capable of providing various services, e.g., copy, scan (transmit), and print. A random access memory (RAM) 213 is used as a main memory and a temporary storage area, such as a work area, of the CPU 211.

A hard disk drive (HDD) 214 stores image data, various programs, and various information tables. An operation unit interface (I/F) 215 connects an operation unit 219 to the control unit 210. The operation unit 219 includes a liquid crystal display unit having a touch panel function and a keyboard.

The MFP 101 also includes a web browser function to be described below. The web browser in the MFP 101 analyzes an HTML file received from the web server 102 and displays on the liquid crystal display unit in the operation unit 219 an operation screen based on the description of the received HTML file. The liquid crystal display unit may also display an operation screen provided by an application in the MFP 101 instead of the operation screen provided by the web server 102.

A printer I/F 216 connects a printer 220 to the control unit 210. The control unit 210 transfers the image data to be printed by the printer 220 via the printer I/F 216, and the printer 220 prints the image data on a recording medium.

A scanner I/F 217 connects a scanner 221 to the control unit 210. The scanner 221 reads an image on the document, generates the image data, and inputs the image data to the control unit 210 via the scanner I/F 217.

A network I/F 218 connects the control unit 210 (i.e., MFP 101) to the LAN 110. The network I/F 218 transmits the image data and information to external devices (e.g., the web server 102) on the LAN 110 and receives various pieces of information from the external devices on the LAN 110.

Figure 3:
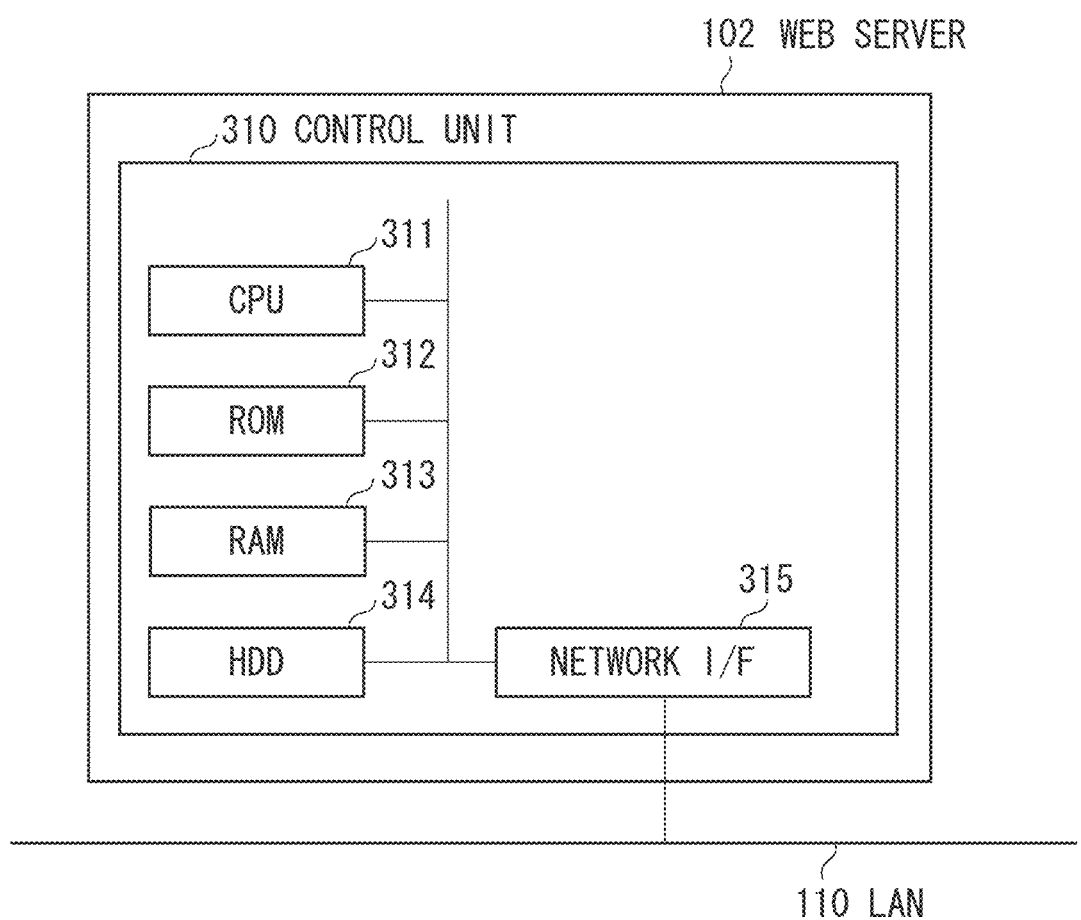
FIG. 3 is a block diagram illustrating a configuration of a web server according to an exemplary embodiment of the present invention.

FIG. 3 is a block diagram illustrating a configuration of the web server 102. Referring to FIG. 3, a control unit 310 which includes a CPU 311 controls the operations of the entire web server 102. The CPU 311 reads out a control program stored in a ROM 312 and performs various control processes. A RAM 313 is used as a main memory and a temporary storage area, such as the work area, of the CPU 311. A HDD 314 stores image data, various programs, and various information tables to be described below.

A network I/F 315 connects the control unit 310 (i.e., Web server 102) to the LAN 110. The network I/F 315 transmits and receives various pieces of information to and from other devices on the LAN 110. The web server 102 also transmits an electronic mail (e-mail) to which the image data is attached via a mail server (not illustrated) on the LAN 110.

Figure 4:
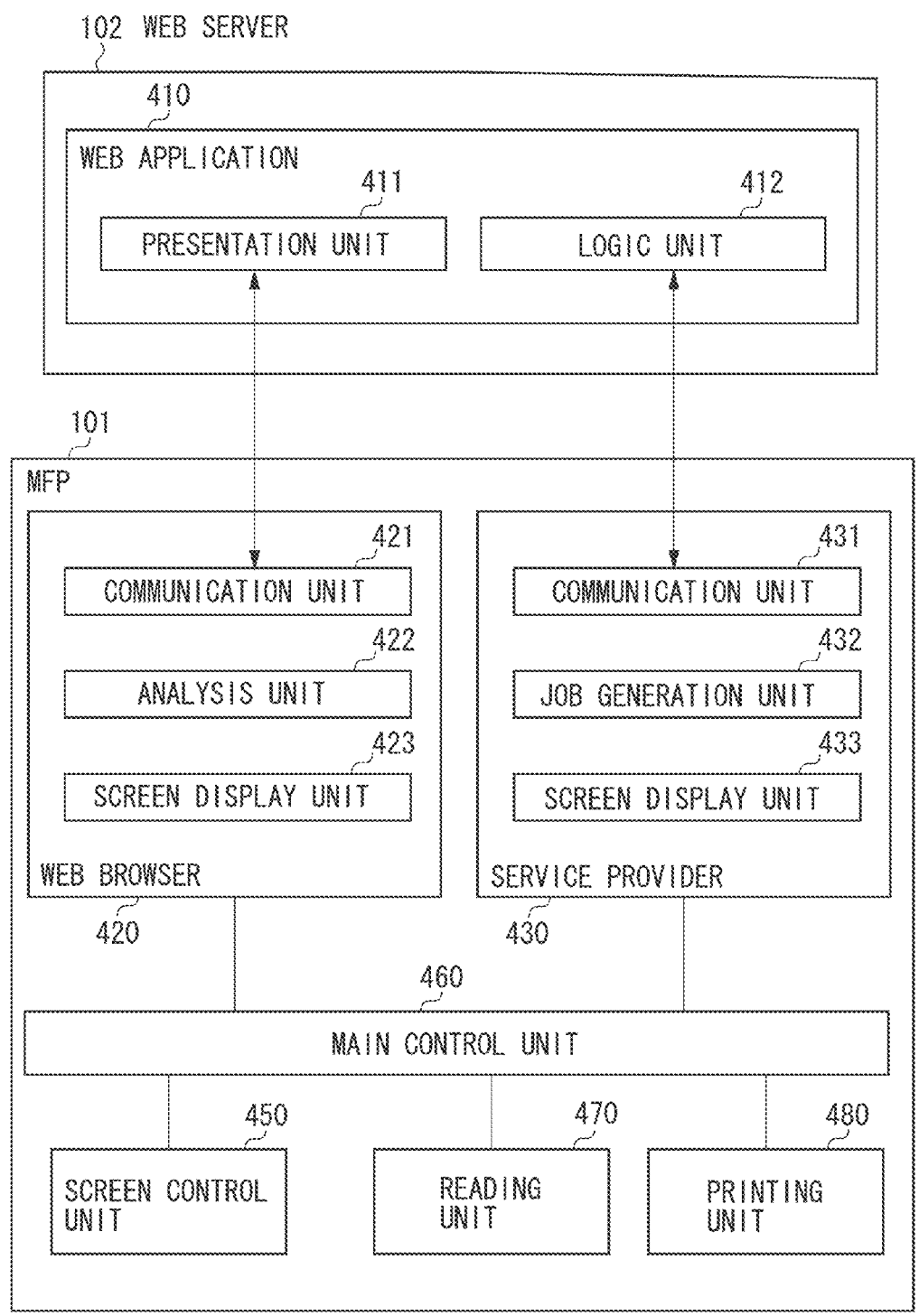
FIG. 4 illustrates a software configuration of the information processing system according to an exemplary embodiment of the present invention.

FIG. 4 illustrates a software configuration of the entire information processing system. Referring to FIG. 4, each functional unit is realized by the CPU included in each of the MFP 101 and the web server 102 executing the control programs.

The MFP 101 includes a web browser 420 and a service provider 430. The web browser 420 includes a communication unit 421, an analysis unit 422, and a screen display unit 423. The communication unit 421 communicates with a presentation unit 411 in a web application 410 according to hypertext transfer protocol (HTTP). More specifically, the communication unit 421 requests the operation screen to be displayed on the web browser from the web application 410, or notifies the web application 410 of an instruction input by the user via the operation screen displayed on the web browser.

The analysis unit 422 analyzes the HTML file received from the web application 410. The HTML file includes the description indicating the content of the operation screen to be displayed on the web browser. The screen display unit 423 creates and updates the operation screen based on the analysis result of the analysis unit 422.

The web application 410 in the web server 102 includes the presentation unit 411 and a logic unit 412.

The presentation unit 411 communicates with the communication unit 421 and transmits to the MFP 101 the operation screen to be displayed on the web browser in the MFP 101 according to the request from the MFP 101. Further, the presentation unit 411 receives from the MFP 101 the content of the instruction input by the user via the operation screen displayed on the web browser in the MFP 101.

Upon receiving the user instruction, the web application 410 executes various processes according to the content of the instruction, and requests the MFP 101 to execute the processes. More specifically, the web application 410 requests printing by the printer 220, reading by the scanner 221, or transmission via the network I/F 218 in the MFP 101.

When the web application 410 requests the MFP 101 to execute such processes as described above, the logic unit 412 communicates with the communication unit 431 in the service provider 430 included in the MFP 101. The logic unit 412 and the communication unit 431 communicate with each other according to simple object access protocol (SOAP)/HTTP protocol.

The service provider 430 includes the communication unit 431, a job generation unit 432, and a screen display unit 433. The communication unit 431 receives the request from the logic unit 412 in the web application 410 to execute the process. Upon the web application 410 requesting execution of the process, the job generation unit 432 generates a job for executing the requested process and executes the job.

The screen display unit 433 creates and updates a screen currently be in execution based on a job execution status of the job generation unit 432. When the screen being in execution is displayed on the operation unit 219, the service provider 430 instructs a screen control unit 450 to display the screen being in execution.

As described above, the MFP 101 includes the service provider 430, so that the MFP 101 is capable of providing services such as copy, scan, and print, according to the request from the web server 102 (i.e., the web application 410).

When an instruction to display the operation screen is issued from the web browser 420, the service provider 430, or another module, the screen control unit 450 performs control to display the operation screen in priority to other operation screens. For example, the operation screen is displayed in priority to other operation screens by being displayed in front of the other screens.

In the example illustrated in FIG. 4, the screen control unit 450 controls whether to display the operation screen displayed by the screen display unit 423 or the operation screen displayed by the screen display unit 433 in priority to the operation unit 219 according to the instruction from the user input via the operation unit 219 and the instruction from the service provider 430.

A reading unit 470 performs the reading process using the scanner 221 to read the image on the document and generate the image data. Further, a printing unit 480 performs the printing process using the printer 220 to print an image on a recording medium based on image data. A main control unit 460 controls each of the functional units of the MFP 101.

Figure 5:
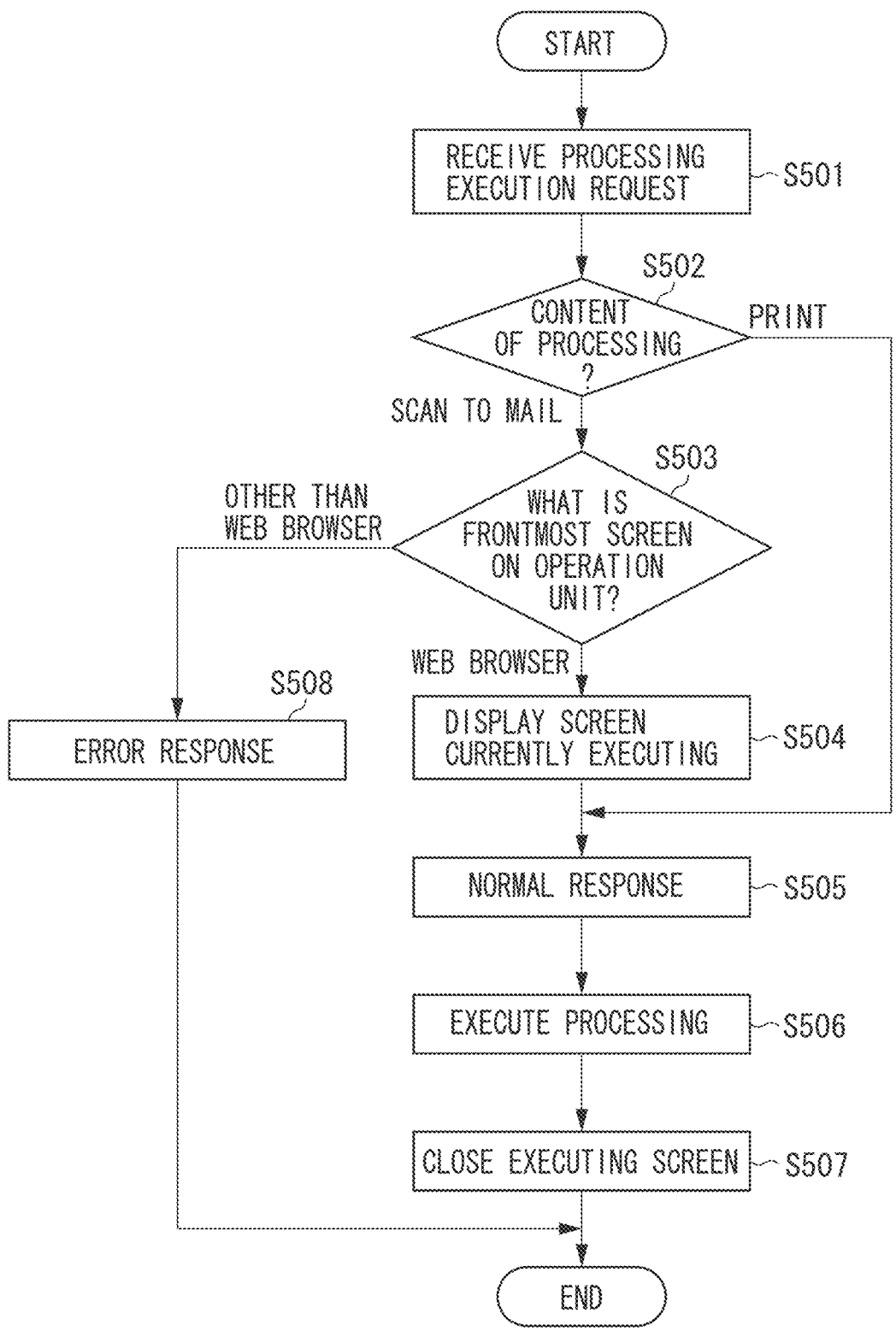
FIG. 5 is a flowchart illustrating an operation of a service provider according to an exemplary embodiment of the present invention.

FIG. 5 is a flowchart illustrating a series of processes performed when the service provider 430 in the MFP 101 receives from the web application 410 a request to execute a process. Each of the processes (steps) illustrated in the flowchart in FIG. 5 is realized by the CPU 211 in the MFP 101 executing the control programs stored in the HDD 214.

In step S501, the communication unit 431 in the service provider 430 receives a request to execute a process from the web application 410.

In step S502, the service provider 430 determines the content of the process requested in the process execution request received in step S501. According to the present exemplary embodiment, examples in which the content of the process requested to the service provider 430 include "print" and "scan to mail" will be described below. "Print" is a process in which the printer 220 prints the image data transmitted from the web application 410.

"Scan to mail" is a process in which the web application 410 receives the image data generated by the scanner 221 reading the image on the document, attaches the image data to an e-mail, and then transmits the e-mail from the web server 102 to a desired destination. In "scan to mail", the user confirms the image data generated by the scanner 221 by the preview before transmitting the image data by e-mail.

More specifically, the user previews and confirms the image data by the following method. The web application 410 transmits to and causes the web browser 420 in the MFP 101 to display the image data received from the service provider 430.

After the user confirms the content of the image data, the user operates on the web browser 420 and instructs transmission of the image data. The web application 410 then receives the instruction and transmits the e-mail. On the other hand, if the content of the requested process is "print", the process is completed when the printer 220 prints the image data transmitted from the web application 410. It is thus not necessary for the user to operate on the web browser 420 after the process is executed.

Figure 6:
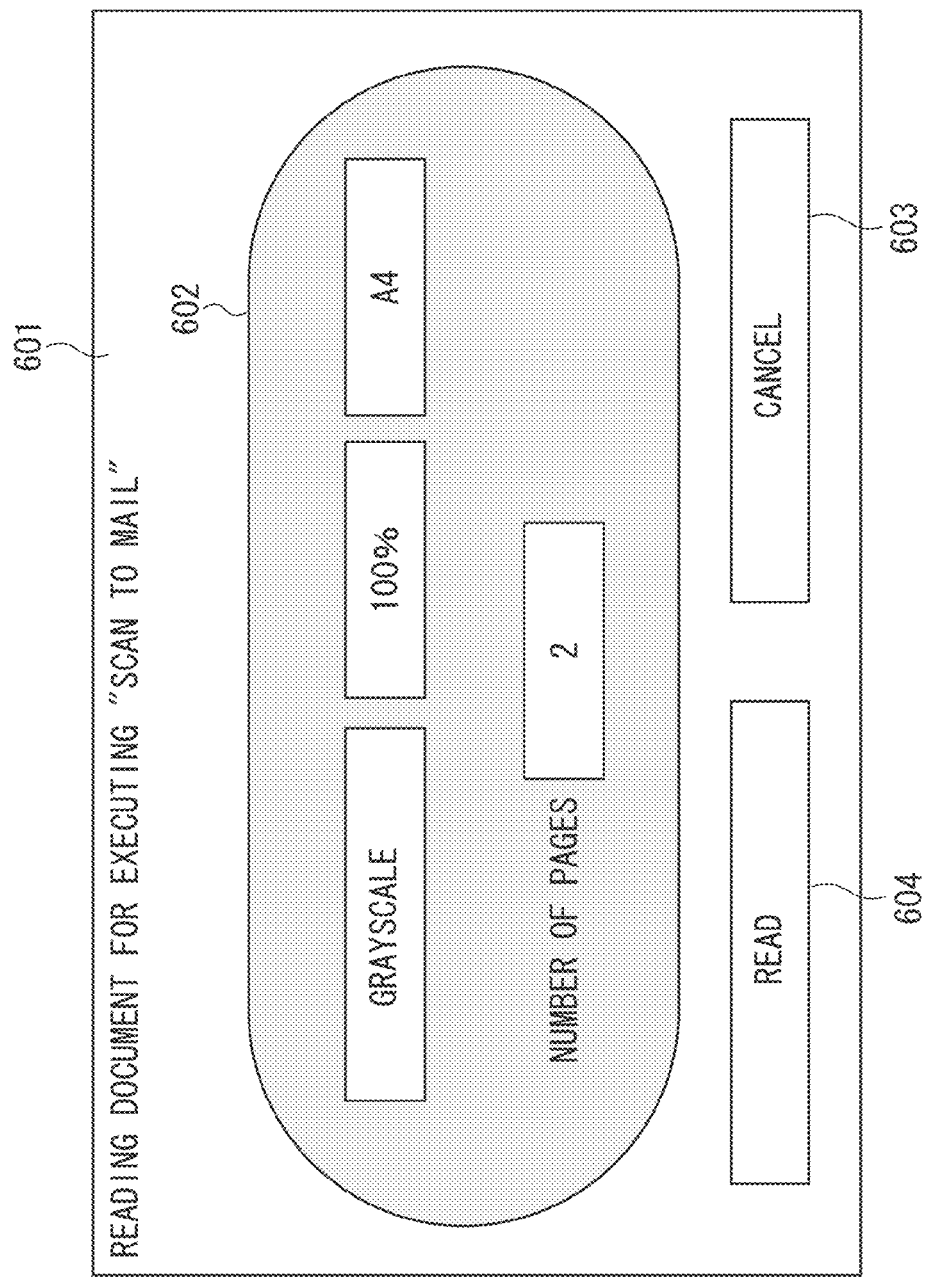
FIG. 6 illustrates an example of an operation screen displayed on an operation unit according to an exemplary embodiment of the present invention.

Further, if the content of the requested process is "scan to mail", a screen as illustrated in FIG. 6 to be described below which indicates that the "process is being executed" is displayed while the scanner reads the document.

Referring to FIG. 6, a "read" button 604 which is used when the user causes the MFP 101 to continuously read a plurality of sheets of the document is included in the screen. The user presses the "read" button 604 after setting the document on the scanner 221, and the MFP 101 then reads the document. If the content of the request process is "print", the above described screen indicating that the "process is being executed" is not displayed.

Returning to FIG. 5, in step S502, if it is determined that the content of the process is "scan to mail" (SCAN TO MAIL in step S502), the process proceeds to step S503. On the other hand, if the content of the process is "print" (PRINT in step S502), the process proceeds to step S505.

In step S503, the service provider 430 inquires the display control unit 450 to determine whether the screen that is currently displayed in the frontmost screen on the operation unit 219 of the MFP 101 is the web browser. If the frontmost screen currently displayed is not the web browser (i.e., an operation screen other than the operation screen displayed by the web browser is displayed) (OTHER THAN WEB BROWSER in step S503), the process proceeds to step S508. In step S508, the CPU 211 responds to the web application 410 that an error has occurred. In such a case, the process requested from the web application 410 is not executed (i.e., the execution becomes restricted).

According to the present exemplary embodiment, an example in which the MFP 101 includes a multi-window function that displays a plurality of operation screens by overlapping one another is described. However, the MFP 101 may be configured to not include the multi-window function (i.e., when an operation screen is to be displayed, the operation screen that is currently displayed is closed). In such a case, the CPU 211 determines in step S503 whether the screen that is currently being displayed is the web browser.

If the frontmost screen that is currently displayed is the web browser (WEB BROWSER in step S503), the process proceeds to step S504. In step S504, the CPU 211 instructs the screen control unit 450 to display the screen illustrated in FIG. 6 on the operation unit 219. As a result, the screen illustrated in FIG. 6 is displayed in front of the other screens (i.e., in front of the web browser) on the operation unit 219.

In step S505, the communication unit 431 transmits a normal response to the web application 410 to notify the web application 410 that the requested process is normally received.

In step S506, the job generation unit 432 generates and executes a job for executing the requested process. More specifically, if the content of the process is "scan to mail", the job generation unit 432 uses the scanner 211 to read the document. Further, if the content of the process is "print", the job generation unit 432 uses the printer 220 to print the image data transmitted from the web application 410.

The screen being in execution displayed in step S504 by the screen display unit 433 may be updated according to the job execution status. After the requested process is completed, the process proceeds to step S507.

In step S507, the service provider 430 instructs the screen control unit 450 to close the screen (illustrated in FIG. 6), and the process ends. Upon receiving the instruction, the screen control unit 450 displays the operation screen displayed previous to the process in step S504 (i.e., the operation screen displayed by the web browser 420) in the frontmost screen on the operation unit 219. If the content of the process is "print", the process in step S504 is not performed, so that the process in step S507 is omitted.

FIG. 6 illustrates an example of the screen being in execution displayed in step S504 illustrated in FIG. 5. Referring to FIG. 6, an area 601 displays the content and the status of the process that is currently being executed. In the example illustrated in FIG. 6, the user can determine that the content of the process is "scan to mail", and that the reading process is currently being executed. The area 601 may be updated according to the process execution status. An area 602 displays details of settings and the current status.

In the example illustrated in FIG. 6, the user can determine that the process is being executed under the settings in which the color setting is grayscale, zoom ratio is 100%, and a document size is A4. Further, the user can determine that the MFP 101 has completed reading the second page of the document. The content displayed in the area 602 (e.g., the page number) may be updated similarly as the area 601. A button 603 is used to cancel the process being executed. A button 604 is used by the user to instruct execution of the reading process after the user sets the document on the scanner 211.

FIG. 7 illustrates an entire sequence including the MFP 101 and the web server 102 when the content of the process requested from the web application 410 is "scan to mail".

In step S701, the web browser 420 accesses and requests the web server 102 (i.e., web application 410) for the operation screen, using a uniform resource locator (URL) previously registered in the web browser 420 or arbitrarily designated by the user. In step S702, upon receiving the request, the web application 410 responds to the MFP 101 (web browser 420) by transmitting the HTML file, i.e., screen data for displaying the operation screen.

In step S703, upon receiving the HTML file, the web browser 420 displays the operation screen and receives the user operation. In step S704, the user instructs execution of "scan to mail", and the web application 410 is notified of the instruction.

In step S705, the web application 410 requests the service provider 430 to execute "scan to mail". In step S706, upon receiving the request, the service provider 430 confirms that the frontmost screen which is currently being displayed on the operation unit 219 is the web browser (i.e., performs the process corresponding to step S503 illustrated in FIG. 5). If the frontmost screen currently displayed on the operation unit 219 is not the web browser, the service provider 430 responds to the web application 410 that there is an error.

In step S707, the service provider 430 instructs the screen control unit 450 to display the screen illustrated in FIG. 6 on the operation unit 219 (i.e., performs the process corresponding to step S504 illustrated in FIG. 5). In step S708, the service provider 430 transmits the normal response to the web application 410 (i.e., performs the process corresponding to step S505 illustrated in FIG. 5).

In step S709, the service provider 430 executes the requested process (i.e., performs the process corresponding to step S506 illustrated in FIG. 5). In step S710, the service provider 430 transmits to the web application 410 the image data acquired by performing the reading process. In step S711, the web application 410 transmits to the web browser 420 the image data received from the service provider 430.

In step S712, the web browser 420 displays the preview of the image data received from the web application 410 and causes the user to confirm the content of the image data. The user then confirms the content of the image data and instructs via the operation screen displayed on the web browser 420 transmission of the image data. In step S713, the web browser 420 notifies the web application 410 of the user instruction.

In step S714, the web application 410 attaches the image data to and transmits the e-mail. It is assumed that the user designates the address of the e-mail via the operation screen displayed in step S703.

As described above, according to the present exemplary embodiment, the service provider 430 can switch between whether to execute the process under condition of the web browser being currently displayed in the frontmost screen according to the content of process requested by the web application 410. In other words, if the content of the requested process is "scan to mail", the web browser executes the process under the condition of the web browser being currently displayed in the frontmost screen. Accordingly, the execution of the process is restricted when the screen has previously been switched to another operation screen (e.g., the web browser is closed).

The user operation is thus not interrupted by the screen indicating that the "process is being executed", displayed on top of the switched operation screen. Further, it can prevent execution of the process (e.g., reading process) even when the screen has switched to another operation screen so that it is unlikely for the user operation (e.g., preview confirmation) to be performed after the process is executed. Accordingly, the image data generated by executing the reading process can be prevented from being accumulated in the web server 102 without being confirmed by the user.

On the other hand, if the content of the requested process is "print", the process is executed regardless of whether the web browser is currently displayed in the frontmost screen. Since the "print" process does not require the user operation to be performed after the process is executed, it is less likely for the execution of the process to become useless even when the screen has been switched to another operation screen. Further, if "print" is to be executed, the screen indicating that the "process is being executed" is not displayed, so that the user operation via the switched operation screen is not interrupted.

According to the present exemplary embodiment, "scan to mail" is described as an example of a process which is regarded as "a process requiring the user operation after the process is executed", or "a process in which the screen indicating that the 'process is being executed' is displayed" (i.e., a first type process). Further, "print" is described as an example of a process that does not correspond to such a process (i.e., a second type process). However, the contents of the processes classified to each of the above described processes are not limited to "scan to mail" and "print".

Further, information indicating whether the content or the type of each process "requires the user operation after the process is executed" or "displays the screen indicating that the 'process is being executed'" may be previously managed in the service provider 430. Moreover, when the web application 410 requests execution of the process, the web application 410 may notify of the information indicating whether the requested process "requires the user operation after the process is executed" or "displays the screen indicating that the 'process is being executed'".

Aspects of the present invention can also be realized by a computer of a system or apparatus (or devices such as a CPU or MPU) that reads out and executes a program recorded on a memory device to perform the functions of the above described embodiment(s), and by a method, the steps of which are performed by a computer of a system or apparatus by, for example, reading out and executing a program recorded on a memory device to perform the functions of the above described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-285757 filed Dec. 16, 2009, which is hereby incorporated by reference herein in its entirety.

What is claimed is:

1. An information processing apparatus including a display unit that is capable of displaying an operation screen, the information processing apparatus comprising:
 a notification unit configured to notify a server of an instruction from a user via an operation screen provided by the server and displayed on the display unit;
 a processing unit configured to execute, if the server requests execution of a process relating to image data based on the instruction notified from the notification unit, the requested process;
 a first determination unit configured to determine whether or not the operation screen displayed on the display unit is the operation screen provided by the server;
 a control unit configured to cause, if the operation screen displayed on the display unit is the operation screen provided by the server, the processing unit to execute the process requested by the server, and to cause, if the operation screen displayed on the display unit is not the operation screen provided by the server, the processing unit not to execute the process requested by the server, based on the determination by the first determination unit; and
 a second determination unit configured to determine whether the process requested by the server is a first type process or a second type process,
 wherein if the process requested by the server is the first type process, the control unit executes control based on the result of determination by the first determination unit, and if the process requested by the server is the second type process, the control unit causes the processing unit to execute the process requested by the server regardless of an operation screen being displayed on the display unit; and
 wherein the notification unit, the processing unit, the first determination unit, and the control unit are, at least in part, implemented by a processor and a memory.

2. The information processing apparatus according to claim 1, wherein the first type process is a process in which an operation by a user is necessary after execution of the process is started, and the second type process is a process in which an operation by a user is not necessary after execution of the process is started.

3. The information processing apparatus according to claim 1, further comprising a display control unit configured to display, when the processing unit executes a process, a screen on the display unit indicating that the process is being executed,
 wherein the first type process is a process in which the display control unit displays the screen when the process is executed, and the second type process is a process in which the display control unit does not display the screen when the process is executed.

4. The information processing apparatus according to claim 1, further comprising a reading unit configured to read an image on a document and generate image data corresponding to the image,
 wherein the first type process includes a reading process executed by the reading unit.

5. The information processing apparatus according to claim 1, further comprising a printing unit configured to print image data transmitted from the server,
 wherein the second type process includes a printing process executed by the printing unit.

6. The information processing apparatus according to claim 1, wherein the display unit includes a web browser function for receiving an HTML file transmitted from the server and displaying the operation screen based on a result of analyzing the HTML file.

7. The information processing apparatus according to claim 6, wherein the first determination unit determines that the operation screen displayed on the display unit is the operation screen provided by the server if the operation screen displayed by the web browser function is displayed in a front-most screen on the display unit, and the first determination unit determines that the operation screen displayed on the display unit is not the operation screen provided by the server if an operation screen other than the operation screen displayed by the web browser function is displayed in a front-most screen on the display unit.

8. A method for controlling an information processing apparatus including a display unit that is capable of displaying an operation screen, the method comprising:
 notifying a server of an instruction from a user via an operation screen provided by the server and displayed on the display unit;
 executing, if the server requests execution of a process relating to image data based on the notified instruction, the requested process;
 determining whether or not the operation screen displayed on the display unit is the operation screen provided by the server;
 executing, if the operation screen displayed on the display unit is the operation screen provided by the server the process requested by the server, but not executing, if the operation screen displayed on the display unit is not the operation screen provided by the server, the process requested by the server, based on the determination;
 determining whether the process requested by the server is a first type process or a second type process; and
 executing, if the process requested by the server is the first type process, control via a control unit to determine whether or not the operation screen displayed on the display unit is the operation screen provided by the server, and if the process requested by the server is the second type process, the control unit causes execution of the process requested by the server regardless of an operation screen being displayed on the display unit.

9. A non-transitory storage medium storing a program for causing a computer to execute a method comprising:

notifying a server of an instruction from a user via an operation screen provided by the server and displayed on the display unit;

executing, if the server requests execution of a process relating to image data based on the notified instruction, the requested process;

determining whether or not the operation screen displayed on the display unit is the operation screen provided by the server;

executing, if the operation screen displayed on the display unit is the operation screen provided by the server, the process requested by the server, but not executing, if the operation screen displayed on the display unit is not the operation screen provided by the server, the process requested by the server, based on the determination;

determining whether the process requested by the server is a first type process or a second type process; and executing, if the process requested by the server is the first type process, control via a control unit to determine whether or not the operation screen displayed on the display unit is the operation screen provided by the server, and if the process requested by the server is the second type process, the control unit causes execution of the process requested by the server regardless of an operation screen being displayed on the display unit.

* * * * *